United States Patent
Ye et al.

(10) Patent No.: US 11,516,440 B2
(45) Date of Patent: Nov. 29, 2022

(54) METHOD FOR MODAL ANALYSIS OF BRIDGE STRUCTURES BASED ON SURVEILLANCE VIDEOS

(71) Applicant: ZHEJIANG UNIVERSITY, Hangzhou (CN)

(72) Inventors: Xiaowei Ye, Hangzhou (CN); Zhexun Li, Hangzhou (CN); Tao Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/534,759

(22) Filed: Nov. 24, 2021

(65) Prior Publication Data

US 2022/0166957 A1     May 26, 2022

(30) Foreign Application Priority Data

Nov. 25, 2020  (CN) .......................... 202011337886.0

(51) Int. Cl.
    *H04N 7/18*     (2006.01)
(52) U.S. Cl.
    CPC .................... *H04N 7/181* (2013.01)
(58) Field of Classification Search
    CPC ..................................................... H04N 7/181
    USPC ........................................................ 348/159
    See application file for complete search history.

(56) References Cited

U.S. PATENT DOCUMENTS

| | | | | |
|---|---|---|---|---|
| 2010/0268409 | A1* | 10/2010 | Vian | G05D 1/104 701/25 |
| 2014/0168422 | A1* | 6/2014 | Feng | G01S 17/86 382/106 |
| 2015/0009331 | A1* | 1/2015 | Venkatraman | B61L 27/53 348/148 |
| 2017/0103507 | A1* | 4/2017 | Fuchs | G06V 20/52 |
| 2019/0178814 | A1* | 6/2019 | Nakano | G01N 21/88 |
| 2020/0074730 | A1* | 3/2020 | Shloosh | G01S 17/89 |
| 2021/0116248 | A1* | 4/2021 | Inotsume | G01M 99/00 |

FOREIGN PATENT DOCUMENTS

| | | | |
|---|---|---|---|
| CN | 105865735 | A | 8/2016 |
| CN | 109448443 | A | 3/2019 |
| CN | 111225189 | B | 3/2021 |

* cited by examiner

*Primary Examiner* — Joseph G Ustaris
*Assistant Examiner* — Matthew David Kim
(74) *Attorney, Agent, or Firm* — Wayne IP LLC

(57) ABSTRACT

A method for modal analysis of bridge structures based on surveillance videos is provided. A plurality of continuous cameras are utilized for realizing high-precision surveillance for the structure of the bridge. Firstly, a plurality of regions are selected in the viewing angle of each of the cameras, and a conversion relation between images of the regions and actual displacements is calculated; next, displacements on the images shot by the cameras are converted into actual displacements of targets, so as to obtain displacements of the targets relative to the cameras; displacements of the adjacent cameras are sequentially passed according to a difference value from the ground of an abutment, so as to obtain displacements of all camera bodies; and finally, the displacements of all the targets relative to the ground of the abutment are calculated, and the structural mode of the bridge is calculated.

1 Claim, 1 Drawing Sheet

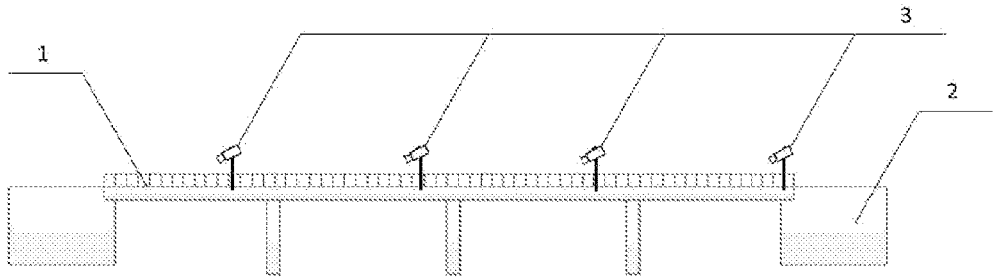
Fig. 1
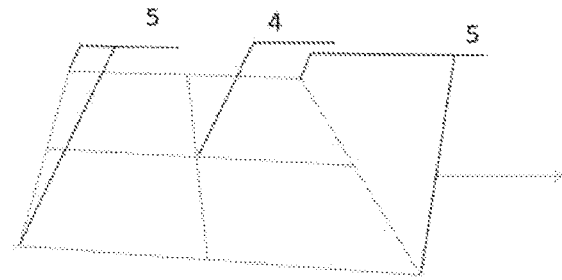 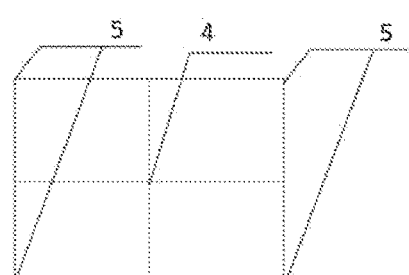
Fig. 2a  Fig. 2b
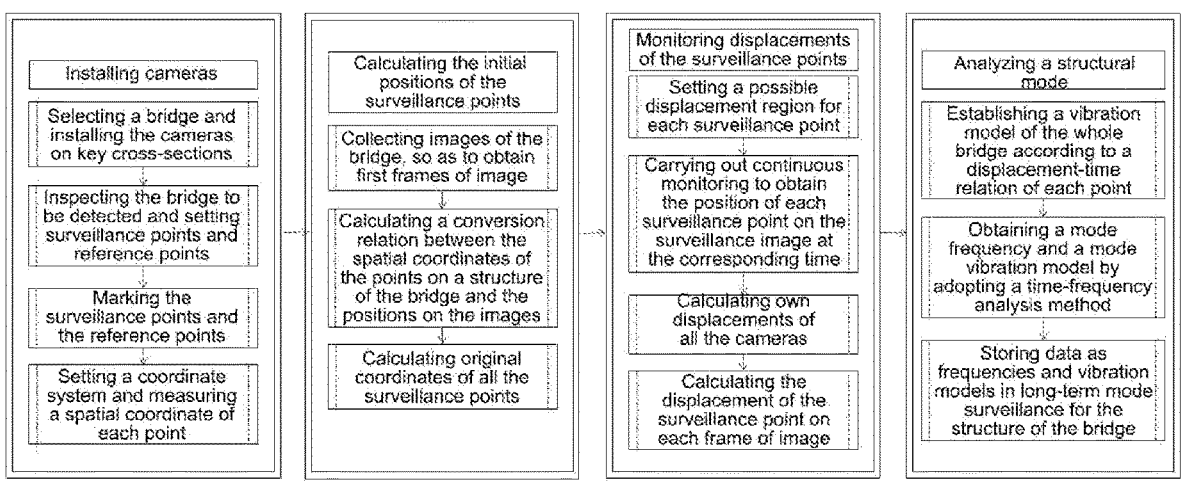
Fig. 3

METHOD FOR MODAL ANALYSIS OF BRIDGE STRUCTURES BASED ON SURVEILLANCE VIDEOS

CROSS-REFERENCE TO RELATED APPLICATIONS

This application claims the benefit of priority from Chinese Patent Application No. 202011337886.0, filed on Nov. 25, 2020. The content of the aforementioned application, including any intervening amendments thereto, is incorporated herein by reference in its entirety.

TECHNICAL FIELD

The present invention relates to a method for modal analysis of bridge structures.

BACKGROUND OF THE PRESENT INVENTION

The structure of a bridge, in particular to a long span bridge, experiences long-term deflection changes due to the influences of continuous and short-term loads, including stress redistribution caused by dead weight, pre-stress, traffic, temperature change and damage. Due to the influences of imperfect design theories, material limitation during construction, defects of construction quality, sudden overload disasters and the like, some bridges have great potential safety hazards in operation. Due to fatigue and aging of materials of the bridges, collapse accidents of the bridges constantly emerge, resulting in a large number of economic losses and casualties. Therefore, more and more attention is paid on safety operation and health surveillance of the bridges.

In bridge surveillance, the structural mode is an important safety index representing the change of structural stiffness, which can be widely used in structural health surveillance and can be obtained by vibration analysis. The existing vibration measurement methods of the bridge structure are described as follows:

When a contact sensor is used for surveillance, a fiber grating displacement sensor and the like or a piezoelectric/capacitive acceleration sensor and the like usually need to be stuck on the structure or embedded into the structure, so that a displacement or an acceleration value is converted into electric quantity, and the surveillance for vibration of the structure is realized. In practical engineering application, the contact sensor plays a very important role. A method using the contact sensor for surveillance is higher in accuracy, but difficult in installation and maintenance; and meanwhile, the original structure is damaged, and the method has great limitation.

In a method for identifying a mode of a bridge through moving vehicles, a road needs to be blocked before a test, so as to eliminate the interference of other vehicle. In the test process, a detection vehicle equipped with an acceleration sensor is driven to pass through a target bridge to record vibration data of the vehicle in the driving process on the surface of the bridge. The method is usually used for detecting the structure of the bridge; and as the detection frequency is lower, the method is difficult to apply to long-term surveillance for the structure. Additionally, the road is blocked when in detection, which affects vehicle traffic; and the detection is difficult to implement in heavy traffic sections.

Through adoption of a computer vision method as a novel displacement measurement method, the defects of the above contact and non-contact displacement measurement methods can be effectively avoided. The advantages of long distance, non-contact, low cost, high precision and anti-electromagnetic interference of the computer vision method have been concerned and recognized by vast civil engineering researchers.

Through adoption of the previous computer vision method, in order to realize surveillance for the structure of the whole bridge, a camera is usually arranged at the position which is far away from the bridge, and it is difficult to ensure the measurement accuracy. Two problems in calling for the surveillance camera on the bridge are that: the surveillance camera is difficult to cover the bridge; and meanwhile, a picture of a nearby place, which is shot by the surveillance camera, has great distortion, and the identification for the displacement of the bridge is affected.

SUMMARY OF THE PRESENT INVENTION

Based on the above analysis, in order to overcome the above defects in the prior art, the present invention provides a method for modal analysis of bridge structures based on surveillance videos.

In the method for modal analysis of bridge structures based on surveillance videos, a plurality of continuous cameras are utilized for realizing high-precision surveillance for a displacement of a structure of the bridge. Firstly, a plurality of regions are selected in the viewing angle of each of the cameras, and a conversion relation between images of the regions and actual displacements is calculated; next, displacements on the images shot by the cameras are converted into actual displacements of targets, so as to obtain displacements of the targets relative to the cameras; displacements of the adjacent cameras are sequentially passed according to a difference value from the ground of an abutment, so as to obtain displacements of all camera bodies; and finally, the displacements of all the targets relative to the ground of the abutment are calculated, and the structural mode of the bridge is calculated.

The method for modal analysis of bridge structures based on surveillance videos of the present invention includes the following steps:

A. installing cameras and calibrating surveillance points and reference points;

A1. installing a plurality of cameras on the bridge to be detected and ensuring the adjacent cameras to be in surveillance regions thereof;

A2. inspecting the bridge to be detected; comprehensively considering the surface of a road, handrails, the positions of the surveillance cameras and surveillance regions; selecting the surveillance points and the reference points as required; ensuring no shielding of barriers between all the points and the surveillance cameras when the points are selected; and selecting at least four reference points;

A3. marking the surveillance points and the reference points, wherein the marked points are greatly different from the surrounding background, so that the marked points are easily identified by a computer;

A4. setting a coordinate system on the surface of the road of the bridge and measuring spatial coordinates of the reference points;

B. calculating the initial positions of the surveillance points;

B1. collecting images of the surface of the bridge by the surveillance cameras, so as to obtain first frames of images;

B2. obtaining the positions of the surveillance points on the surveillance images through the B1 step, wherein a proportional relation between the obtained images and actual targets cannot be directly obtained as the images obtained by the surveillance cameras have distortion; and calculating a conversion relation between the spatial coordinates of the points on the structure of the bridge and the positions on the images according to actual coordinates of the reference points determined in advance and the positions of the reference points on the images on a surveillance chart;

B3. calculating original coordinates of all the surveillance points according to the conversion relation obtained in the B2 step and the positions of the surveillance points on the images;

C. monitoring displacements of the surveillance points;

C1. selecting the surveillance points as tracing templates in the first frames of images, estimating the displacements of each of the surveillance points possibly generated in the monitoring period and setting a possible displacement region for each surveillance point;

C2. as the positions of the surveillance points are changed in the dynamic displacement monitoring process, carrying out continuous surveillance to obtain the position of each surveillance point on the corresponding surveillance image at the corresponding time;

C3. sequentially calculating the displacement of the camera in the monitoring scope, which is relative to the former camera according to the conversion relation in the B2 step from the camera which is installed on the abutment and is supposed to have no displacement, and calculating the own displacements of all cameras; and C4. calculating a spatial coordinate of each surveillance point in the actual spatial on each frame of image, adding the own displacement of each camera to obtain the spatial coordinate of the surveillance point and comparing the spatial coordinate of the surveillance point and the corresponding original coordinate, so as to obtain the displacement of the surveillance point at the moment;

D. analyzing the structural mode;

D1. establishing a vibration model of the whole bridge according to a relation between the displacement and the time of each point in the C4 step;

D2. intercepting vibration data in the recent one minute and obtaining a mode frequency and a mode vibration model by adopting time-frequency analysis methods of Fourier transform and wavelet transform;

D3. storing the data obtained in the D2 step and the corresponding time as data of frequencies and vibration models in long-term mode surveillance for the structure of the bridge.

Compared with the prior art, the technology has the following advantages that:

1. As video images are adopted for detection, and a non-contact surveillance method is adopted, the analysis method of the present invention is wide in application scope, and the accuracy rate of surveillance is not affected by environmental factors such as temperature, humidity, alkalinity or acidity.

2. The existing surveillance cameras are utilized, and new monitoring equipment does not need to be installed, thereby greatly reducing various sensors, in particular to the number of the acceleration sensor.

3. Instruments and equipment are simple and are conveniently installed, so as to avoid affecting the own structure or the traffic condition.

4. In the analysis method, a full view corresponding to the structure is reconstructed in synchronization with surveillance videos of all sections of the bridge.

5. The problem that the structure is distorted when the spatial coordinates or displacements are calculated according to the computer vision method is solved, real images are restored, and the monitoring precision and accuracy are improved.

6. The instruments are long in service life and can adapt to long-term monitoring requirements.

BRIEF DESCRIPTION OF THE DRAWINGS

FIG. 1 is a schematic diagram of arrangement of instruments for implementing a method of the present invention;

FIG. 2a and FIG. 2b are schematic diagrams of restoring of distortion in the present invention, wherein FIG. 2a shows an original image obtained by a surveillance camera, and FIG. 2b shows an image after the distortion is restored; and FIG. 3 is a flow chart of implementation of the present invention.

DESCRIPTION OF THE DRAWINGS 1-bridge to be detected;
2-abutment;
3-surveillance camera;
4-surveillance point;
5-reference point.

DETAILED DESCRIPTION OF THE PRESENT INVENTION

The specific implementation manner of the present invention is further described hereinafter in combination with a schematic diagram of arrangement of instruments shown in FIG. 1, a schematic diagram of restoring of distortion shown in FIG. 2 and a flow chart of implementation shown in FIG. 3. The method includes the following steps:

A. installing cameras and calibrating surveillance points and reference points;

A1. installing a plurality of cameras 3 on a bridge 1 to be detected and ensuring the adjacent cameras to be in surveillance regions thereof;

A2. inspecting the bridge to be detected; comprehensively considering the surface of a road, handrails, the positions of the surveillance cameras and surveillance regions; selecting the surveillance points 4 and the reference points 5 as required; ensuring no shielding of barriers between all the points and the surveillance cameras when the points are selected; and selecting at least four reference points;

A3. marking the surveillance points and the reference points, wherein the marked points are greatly different from the surrounding background, so that the marked points are easily identified by a computer;

A4. setting a coordinate system on the surface of the road of the bridge and measuring spatial coordinates of the reference points;

B. calculating the initial positions of the surveillance points;

B1. collecting images of the surface of the bridge by the surveillance cameras, so as to obtain first frames of images;

B2. obtaining the positions of the surveillance points 4 on the surveillance images through the B1 step, wherein a proportional relation between the obtained images and actual targets cannot be directly obtained as the images obtained by the surveillance cameras have distortion; and calculating a conversion relation between the spatial coordinates of the points on the structure of the bridge and the positions on the images according to actual coordinates of the reference points 5 determined in advance and the positions of the reference points on the images on a surveillance chart;

B3. calculating original coordinates of all the surveillance points according to the conversion relation obtained in the B2 step and the positions of the surveillance points on the images;

C. monitoring displacements of the surveillance points;

C1. selecting the surveillance points 4 as tracing templates in the first frames of images, estimating the displacements of each of the surveillance points possibly generated in the monitoring period and setting a possible displacement region for each surveillance point;

C2. as the positions of the surveillance points are changed in the dynamic displacement monitoring process, carrying out continuous monitoring to obtain the position of each surveillance point on the corresponding surveillance image at the corresponding time;

C3. sequentially calculating the displacement of the camera in the monitoring scope, which is relative to the former camera according to the conversion relation in the B2 step from the camera which is installed on an abutment 2 and is supposed to have no displacement, and calculating the own displacements of all cameras; and C4. calculating a spatial coordinate of each surveillance point in the actual spatial on each frame of image, adding the own displacement of each camera to obtain the spatial coordinate of the surveillance point and comparing the spatial coordinate of the surveillance point and the corresponding original coordinate, so as to obtain the displacement of the surveillance point at the moment;

D. analyzing the structural mode;

D1. establishing a vibration model of the whole bridge according to a relation between the displacement and the time of each point in the C4 step;

D2. intercepting vibration data in the recent one minute and obtaining a mode frequency and a mode vibration model by adopting time-frequency analysis methods of Fourier transform and wavelet transform;

D3. storing the data obtained in the D2 step and the corresponding time as data of frequencies and vibration models in long-term mode monitoring for the structure of the bridge.

The contents described in embodiments of this description are only used for listing the realization form of the inventive concept, and the protection scope of the present invention shall not be regarded to be only limited to the specific form stated in the embodiments. The protection scope of the present invention also includes equivalent technical means that can be thought of by those skilled in the art according to the inventive concept.

What is claimed is:

1. A method for modal analysis of a bridge based on surveillance videos, the method comprising:
    a) providing a plurality of cameras spaced apart along a length of the bridge while ensuring adjacent cameras to be in surveillance regions, the plurality of cameras comprising cameras provided on a surface of the bridge and a camera provided on an abutment of the bridge;
    b) selecting and marking a plurality of surveillance points in the surveillance regions and at least four reference points on the bridge, and measuring spatial coordinates of the reference points;
    c) collecting images captured by the cameras to obtain first frames, and identifying positions of the reference points and initial positions of the surveillance points on the first frames;
    d) calculating a conversion relation between the spatial coordinates of the reference points and the positions of the reference points on the first frames, and determining initial spatial coordinates of the surveillance points according to the conversion relation and the initial positions of the surveillance points on the first frames;
    e) monitoring displacements of the surveillance points over a period to obtain new positions of the surveillance points at a time point during the period on images captured by the cameras on the bridge;
    f) determining a displacement of one of the cameras relative to adjacent another one of the cameras, starting from the camera on the abutment that is assumed stationary, to ultimately obtain displacements of all the cameras according to the conversion relationship;
    g) determining new spatial coordinates of the surveillance points according to the conversion relation and the new positions of the surveillance points on the images, and measuring, taking into consideration the displacements of all the cameras, displacements of the surveillance points according to the initial spatial coordinates and the new spatial coordinates of the surveillance points; and
    h) building a vibration model according to a displacement over time relationship for the surveillance points to obtain a mode frequency and a mode vibration model through time-frequency analysis using Fourier transform and wavelet transform, and storing the mode frequency and the mode vibration model for constant monitoring of the bridge.

* * * * *